(12) United States Patent
Kessing

(10) Patent No.: US 7,754,120 B2
(45) Date of Patent: Jul. 13, 2010

(54) THREE LAYER COMPOSITE PANEL FROM RECYCLED POLYURETHANES

(76) Inventor: Reinhard H. Kessing, 18536 SW. 79th Ct., Miami, FL (US) 33157

( * ) Notice: Subject to any disclaimer, the term of this patent is extended or adjusted under 35 U.S.C. 154(b) by 0 days.

(21) Appl. No.: 12/383,015

(22) Filed: Mar. 19, 2009

(65) Prior Publication Data

US 2009/0236765 A1    Sep. 24, 2009

Related U.S. Application Data

(60) Division of application No. 11/335,204, filed on Jan. 19, 2006, now Pat. No. 7,527,865, which is a continuation of application No. 11/175,642, filed on Jul. 6, 2005, now abandoned.

(51) Int. Cl.
    *B29C 59/02* (2006.01)
(52) U.S. Cl. .................. 264/113; 264/122; 264/128
(58) Field of Classification Search ............... 264/113, 264/122, 128
    See application file for complete search history.

(56) References Cited

U.S. PATENT DOCUMENTS

| | | | |
|---|---|---|---|
| 3,630,819 A | 12/1971 | Conger | |
| 3,671,615 A | 6/1972 | Price | |
| 4,121,957 A | 10/1978 | Allen | |
| 4,258,103 A | 3/1981 | Hosmer et al. | |
| 4,287,014 A | 9/1981 | Gaku et al. | |
| 4,382,108 A | 5/1983 | Carroll et al. | |
| 4,828,897 A | 5/1989 | Staneluis et al. | |
| 4,910,935 A | 3/1990 | Leukel et al. | |
| 4,925,719 A | 5/1990 | Staneluis et al. | |
| 5,089,189 A | 2/1992 | Staneluis et al. | |
| RE33,838 E | 3/1992 | Jaisle et al. | |
| 5,134,023 A | 7/1992 | Hsu | |
| 5,185,380 A | 2/1993 | Diessel et al. | |
| 5,348,778 A | 9/1994 | Knipp et al. | |
| 5,507,894 A | 4/1996 | Ehrat et al. | |
| 5,525,278 A | 6/1996 | Krosch et al. | |
| 5,604,266 A | 2/1997 | Mushovic | |
| 5,665,295 A | 9/1997 | Takamoto et al. | |
| 5,879,608 A | 3/1999 | Lammeck et al. | |
| 6,093,481 A | 7/2000 | Lynn et al. | |
| 6,156,811 A | 12/2000 | Lammeck et al. | |
| 6,159,331 A | 12/2000 | Chou | |
| 6,299,811 B1 | 10/2001 | Gebreselassie et al. | |
| 6,358,599 B1 | 3/2002 | Deibel et al. | |
| 6,451,430 B1 | 9/2002 | Smith | |
| 6,576,176 B1 | 6/2003 | Gebreselassie et al. | |
| 6,641,926 B1 | 11/2003 | Malina et al. | |
| 6,761,794 B2 | 7/2004 | Mott et al. | |
| 6,773,799 B1 | 8/2004 | Persson et al. | |
| 6,803,110 B2 | 10/2004 | Drees et al. | |
| 6,808,810 B2 | 10/2004 | Ohtani et al. | |
| 6,841,023 B2 | 1/2005 | Mott | |

(Continued)

*Primary Examiner*—Thao T. Tran
(74) *Attorney, Agent, or Firm*—Phillips Lytle LLP

(57) ABSTRACT

A process for the manufacture of a three layer composite panel with improved moisture resistance, minimal thickness swell, thermal stability, and a smooth hard surface suitable for direct lamination. The composite panel is produced utilizing recycled polyurethanes, preferably obtained from vehicle headliners, insulated foam panels, foam insulation, energy absorbent panels, and polyisocyanurate foams along with materials incidental to at least one recycled component including composite resins, cloth, adhesives, fiberglass, and plastics. The composite panel is composed of a core layer pressed between two surface layers.

13 Claims, 3 Drawing Sheets

Cross Sectional View of the Three-Layer Composite Panel

U.S. PATENT DOCUMENTS

| | | |
|---|---|---|
| 6,841,101 B2 | 1/2005 | Nakos et al. |
| 2002/0007909 A1 | 1/2002 | Mott et al. |
| 2002/0014297 A1 | 2/2002 | Mott et al. |
| 2002/0015841 A1 | 2/2002 | Saiki et al. |
| 2002/0160680 A1 | 10/2002 | Laurence et al. |
| 2003/0008130 A1 | 1/2003 | Kaneko |
| 2003/0026976 A1 | 2/2003 | Skrzyniarz et al. |
| 2003/0082365 A1 | 5/2003 | Geary et al. |
| 2003/0182895 A1 | 10/2003 | Skrzyniarz et al. |
| 2003/0183334 A1 | 10/2003 | Sjoberg et al. |
| 2004/0003888 A1 | 1/2004 | Mott et al. |
| 2004/0058156 A1 | 3/2004 | Sjoberg et al. |
| 2004/0067352 A1 | 4/2004 | Hagerman et al. |
| 2004/0115399 A1 | 6/2004 | Sjolin et al. |
| 2004/0134587 A1 | 7/2004 | Broberg et al. |
| 2004/0200567 A1 | 10/2004 | Mott et al. |
| 2004/0255538 A1 | 12/2004 | Ruhdorfer |

Cross Sectional View of the Three-Layer Composite Panel

THREE LAYER COMPOSITE PANEL FROM RECYCLED POLYURETHANES

CROSS-REFERENCE TO RELATED APPLICATIONS

This application is a division of commonly owned and U.S. patent application Ser. No. 11/335,204, filed Jan. 19, 2006 now U.S. Pat. No. 7,527,865, which is a continuation of U.S. patent application Ser. No. 11/175,642, filed Jul. 6, 2005 now abandoned. The entire contents of each of these applications is incorporated herein by reference.

TECHNICAL FIELD

The invention relates generally to a process for the manufacture of a three-layer composite panel with improved moisture resistance, minimal thickness swell, thermal stability, and a smooth hard surface suitable for direct lamination. The invention also relates to the composite panel produced by the process. The composite panel is produced utilizing primarily recycled rigid and semi rigid polyurethane foams, preferably obtained from vehicle headliners, insulated foam panels, energy absorbent panels, polyisocyanurate foam bun stock along with materials incidental to at least one recycled component, including composite resins, cloth, adhesives, fiberglass and plastics. The composite panel is composed of a core layer and two surface layers that are bonded in a press.

BACKGROUND OF THE INVENTION

Composite panels and boards are known in the industry. For example, medium density fiberboard, high density fiberboard and hardboard are well known. There are many uses for these boards. In respect of flooring, boards of this type have been used as a carrier board for decorative laminate. The boards or panels are also used in the furniture and building industry.

A finished laminated flooring plank typically consists of four layers, a homogenous wood based board with a decorative layer and a clear wear protection layer on top, and a bottom layer or backer layer to equalize surface tension. The decorative layer is often designed to make the panel resemble wood. The two basic lamination processes are either high-pressure lamination (HPL) or direct lamination (DL). Currently, laminate flooring is not generally used for commercial application or in residential areas such as kitchens and bathrooms, due to the thickness swell of fiberboard when exposed to moisture. Water absorption tends to cause thickness swell of the fiberboard and often results in de-lamination and warping.

There are a variety of polyurethane foams, including flexible, semi-rigid and rigid foams. Polyurethane products are produced by the reaction of a polyisocyanate and a hydroxyl-containing material. A broad spectrum of materials can be produced to meet the needs of specific applications due to the variety of diisocyanates and the wide range of polyols that can be used to produce polyurethane. Most foamed polyurethanes, unlike thermoplastic materials, cannot be melted and reused in its original form.

Rigid polyurethane foams are used primarily for energy management as insulation for buildings, water heaters, refrigerated transport, and commercial and residential refrigeration. Rigid polyurethane foams are also used in construction, appliances, packaging, tanks and pipes, transportation, marine applications, and decorative products. Semi-rigid and flexible polyurethane foams are used as a backing for carpet and in upholstered furniture, mattresses, and automobiles.

Product recycling, due to ecological concerns, is becoming more important worldwide. Polyurethane materials are used in many vehicle components, including headliners, which cover the interior roof of the vehicle. Headliners typically consist of layers of fabric, shock absorbent polyurethane foams, insulating foams and fiberglass backers.

Previous attempts have been made to manufacture a homogeneous board for laminated flooring applications from recycled polyurethane materials. These boards do not include recycled vehicle headliners. These homogeneous boards were not fabricated using a three-layer construction, did not have a closed, non-porous smooth surface layer, and therefore were suitable only for high pressure lamination, but not for direct lamination.

Previous attempts have also been made to form a board from recycled plastic. Some other processes incorporated a mixture of wood and recycled plastic. One known panel uses recycled plastic as a core, sandwiched between layers of cellulose material, such as aspen wafers. This panel uses a mix of recycled plastics from interior seating and covers, headliner, trim and padding components, floor mats, seat divider console, exterior front and rear fascia grill, plastic lighting assemblies, trunk and floor padding components of a vehicle. This panel exhibited a significant drop in modulus of rupture when compared to an aspen wafer panel without a plastic core.

The only three layer panel, mentioned above, includes layers of a wood (cellulose) base. Therefore, none of the methods of manufacture or boards mentioned above describe a three layer composite panel made from recycled, non-organic components with a reduced thickness swell and a closed, non-porous smooth surface suitable for direct lamination. Accordingly, there is a need in the art for a three layer composite panel comprised primarily of recycled polyurethanes along with other materials incidental to the recycled materials with improved moisture resistant properties and a closed, non-porous smooth surface suitable for direct lamination.

SUMMARY OF THE INVENTION

The current invention satisfies the above needs by providing a composite panel comprising a core composed primarily of recycled polyurethanes along with other materials incidental to the components being recycled and two surface layers on either side of said core composed primarily of recycled polyurethanes along with other materials incidental to the components being recycled, wherein the core and the surface layers are each blended with a binding agent and water and compressed together to form a three layer composite panel.

In a preferred embodiment of the invention a process of manufacturing a composite panel from recycled polyurethanes and other materials incidental to the component being recycled is disclosed. The process comprises the steps of producing a core layer comprising the steps of cutting and milling recycled polyurethanes along with other materials incidental to at least one recycled component, passing the milled polyurethanes and other materials incidental to the recycled component through a screen to ensure all particles are not larger than about 3 millimeters in diameter, blending the recycled polyurethanes and other materials incidental to the recycled component with isocyanate and water and cleaning the recycled polyurethanes and other materials incidental to a recycled component in a wind sifter. The surface layer is produced by the steps of cutting and milling recycled polyurethanes and other materials incidental to at least one recycled component, and blending the recycled polyurethanes and other materials incidental to the recycled component with isocyanate and water; cleaning the recycled polyurethanes and other materials incidental to a recycled component in a wind sifter, passing the milled polyurethanes and other materials incidental to the recycled component for the surface layer through a screen to ensure all particles are not larger than about 1.5 millimeters in diameter. The composite panel is then formed into a three layer mat with the blended core layer and the blended surface layers wherein the surface layers are on either side of the core layer and pressing the mat with a press at temperatures from about 40° C. to about 185° C. at a speed of about 10-16 seconds per millimeter of mat thickness with a pressure of about 5 kg/cm$^2$ to about 45 kg/cm$^2$.

Therefore, it is an object of the present invention to provide a composite panel with three layers for use in areas with high moisture comprising a core composed of at least 60% recycled polyurethanes and other materials incidental to the recycled component milled to particles not larger than approximately 3 millimeters in diameter and two surface layers on the outer surfaces of the core composed of at least 40% polyurethanes and other materials incidental to the recycled component milled to particles not larger than approximately 1.5 millimeters in diameter, wherein the core and the surface layers are each blended with isocyanate and water, formed into a three layer panel and compressed together.

These and other objects, features, and advantages of the present invention may be better understood and appreciated from the following detailed description of the embodiments thereof, selected for purposes of illustration and shown in the accompanying drawings.

DETAILED DESCRIPTION

Figure 1:
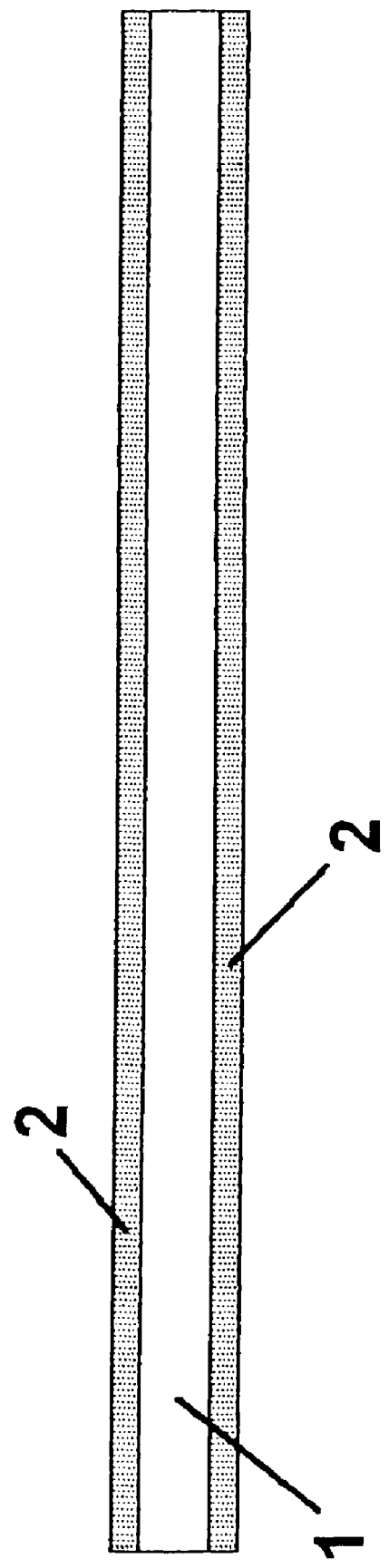
FIG. 1 is a cross sectional view of the composite panel.

Referring to FIG. 1, the composite panel is made up of three layers: a core layer 1 and two surface layers 2. The core layer 1 is made primarily of recycled polyurethanes, which comprises a blend of recycled car headliners, recycled insulated foam panels and/or recycled polyisocyanurate foam. Optionally, the core 1 may be composed of recycled polyurethanes from just one source of recycled car headliners, recycled insulated foam panels or recycled polyisocyanurate foam. The core layer 1 also contains other materials incidental to the recycled components being used and the recycling process. Such materials incidental to the recycled components consist of various materials that are found in the recycled component. For instance, if the source of polyurethane is vehicle headliners, the incidental materials are the other components found within a vehicle headliner. These other materials may include composite resins, cloth, adhesives, fiberglass, plastics, and other materials.

The two surface layers 2 are a blend of recycled energy absorbent panels, recycled insulated foam panels and/or recycled polyisocyanurate foam. Similar to the core layer 1, the two surface layers 2 may be optionally composed of recycled polyurethane from just one source of recycled energy absorbent panels, recycled insulated foam panels or recycled polyisocyanurate foam. The surface layers 2 also contain other materials incidental to the recycled components being used and the recycling process. These other materials may include composite resins, cloth, adhesives, fiberglass, plastics, and other materials.

The entire composite panel is comprised of 40-80% core layer 1 and 20-60% surface layers 2, wherein each surface layer 2 comprises about 10-30% of the panel. In the preferred embodiment, the entire composite panel is comprised of approximately 60% core layer 1 and 40% surface layers 2, wherein each surface layer 2 comprises about 20% of the panel. The surface layers 2 are closed, non-porous smooth surfaces suitable for direct lamination or bonding of other materials to the surface layers 2.

The raw materials used in the manufacturing process are recycled material from vehicle headliners, insulated foam panels, energy absorbent foam panels and/or polyisocyanurate foam. Other raw materials that could be used as filler include carpet fiber, wood flour, and waste paper. In addition to polyurethanes, the raw materials contain other materials incidental to the recycled components being used and the recycling process. These other materials may include composite resins, cloth, adhesives, fiberglass, plastics, and other materials.

Figure 2:
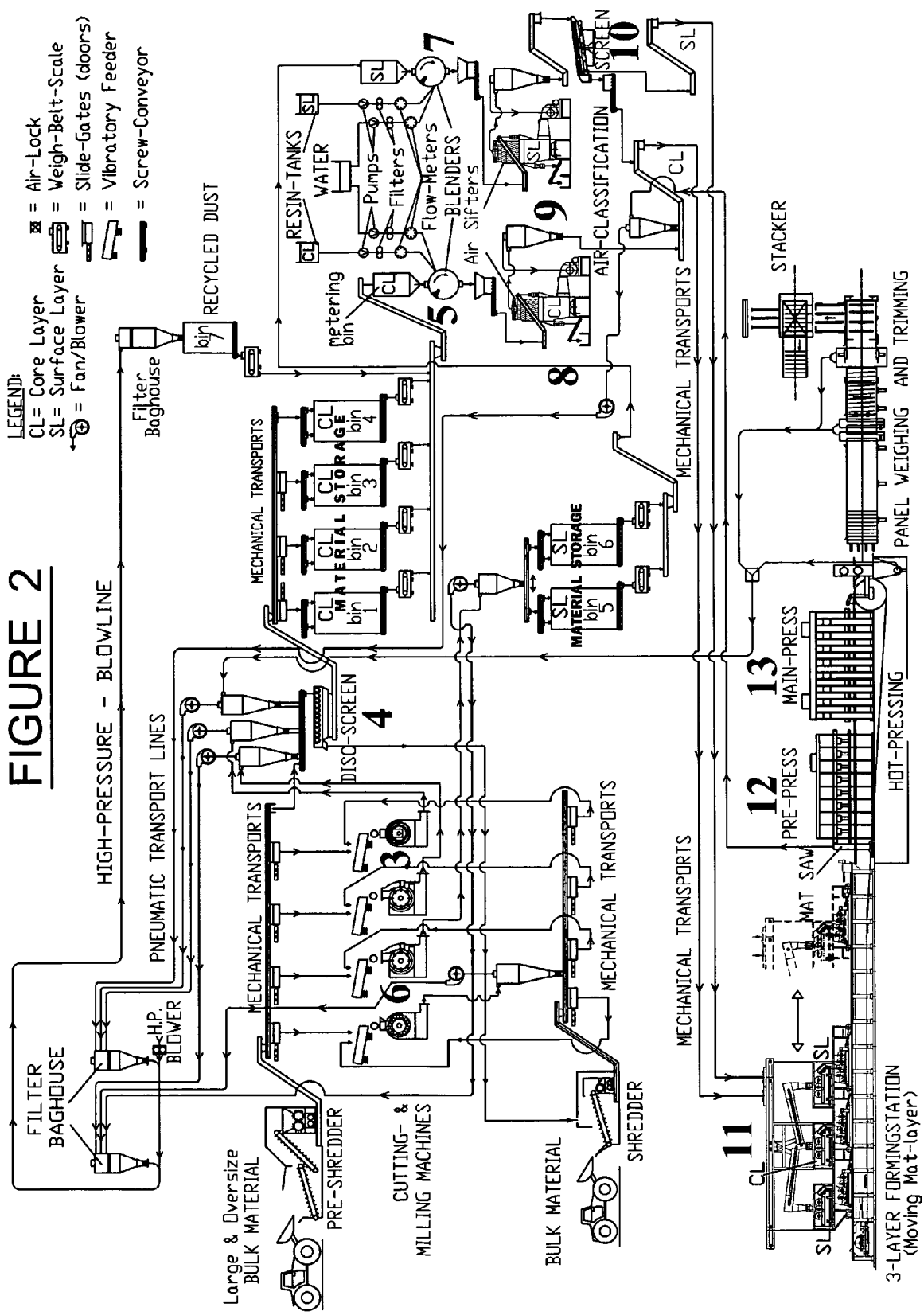
FIG. 2 is a production diagram.
Figure 3:
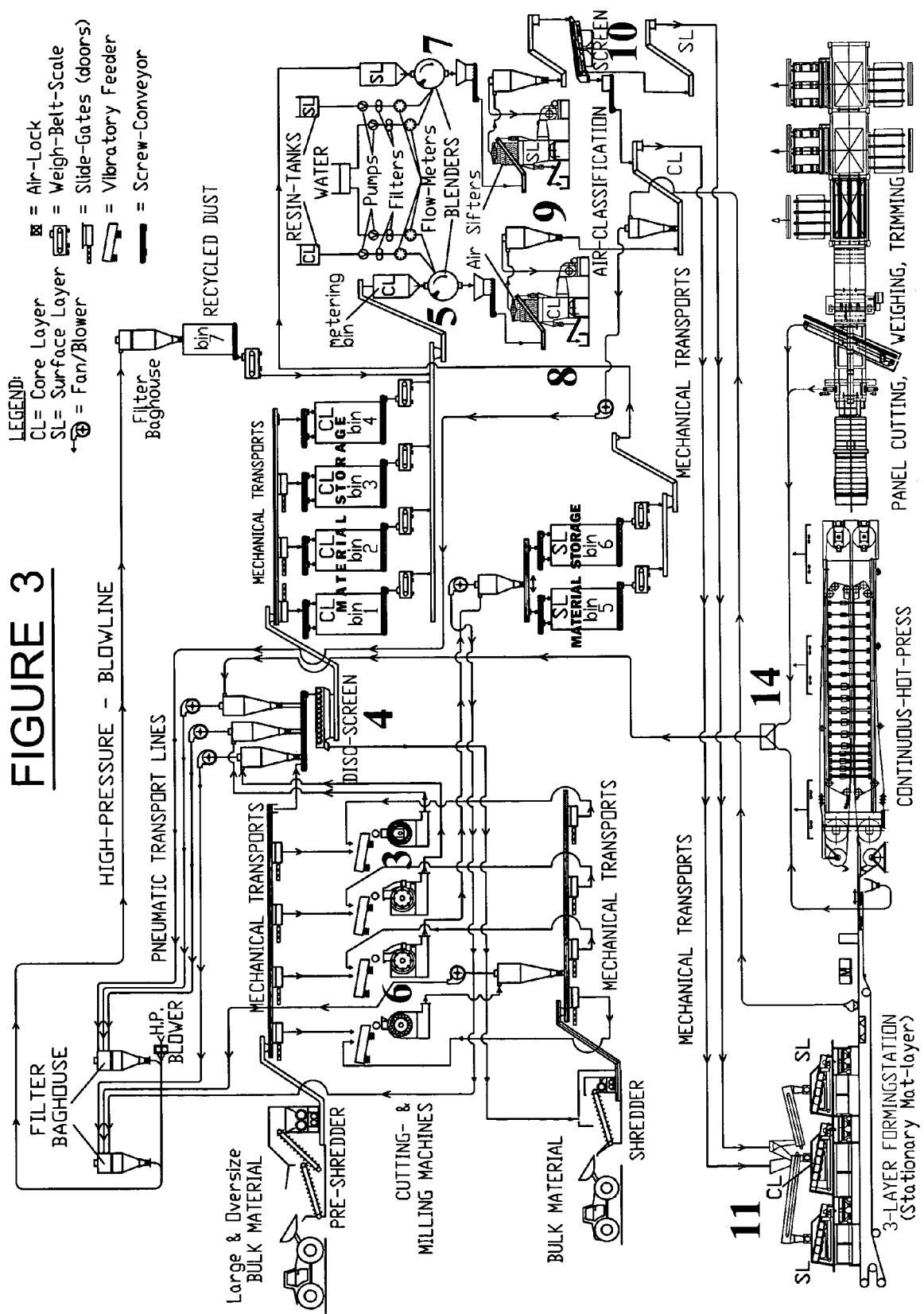
FIG. 3 is a production diagram.

Referring to FIG. 2 and FIG. 3, shown is the preferred embodiment for the process for producing core layer materials, which comprises several steps. First, recycled polyurethanes along with other materials incidental to the recycled component are cut and milled in step 3. Then the milled polyurethanes and other materials incidental to a recycled component are passed through a screen to ensure all particles are not larger than about 3 millimeters in diameter in step 4. In step 5, the recycled polyurethanes and other materials incidental to the recycled component are blended with isocyanate and water. Next, the recycled polyurethanes and other materials incidental to a recycled component are cleaned in a wind sifter in step 8.

Surface layers are produced utilizing a similar process used to form core layers. First, the recycled polyurethanes and other materials incidental to the recycled component are cut and milled in step 6. Then, in step 7 the recycled polyurethanes and other materials incidental to the recycled component are blended with isocyanate and water. Next, the recycled polyurethanes and other materials incidental to a recycled component are cleaned in a wind sifter in step 9. In step 10, the milled polyurethanes and other materials incidental to the recycled component for the surface layer are passed through a screen to ensure all particles are not larger than about 1.5 millimeters in diameter. Preferably, the particles intended to be used on the surface layer are 1.5 millimeters in diameter or smaller.

As shown in FIG. 2 and FIG. 3, the preferred embodiment of the process, the recycled polyurethane materials are prepared by individually processing at least one type of recycled component through cutting and milling machines in step 3 and 6. The raw materials are gravimetrically metered and blended in a centrifugal blending chamber in steps 5 and 7. All material is stored separately in metering silos and a microprocessor weighing system controls the uniformity from batch to batch.

A combination of isocyanate and water is used as a binding agent in the blending process as shown in steps 5 and 7. The isocyanate is preferably diphenylmethane diisocyanate. The volume of isocyanate used ranges from 3 to 10% by weight. The volume of water used ranges from 1 to 9% by weight.

The panel is formed in step 11 by a three layer forming station that forms a core layer and two equal smooth outer face layers. The forming station includes conveyors, metering bins, spreader heads Gamma-Ray density control units and matching control and management systems. The conveyors carry the panel to the presses. As shown in FIG. 2, in step 12 & 13, pressing is performed by a pre-press and a main press utilizing temperatures ranging from 40° C. to 185° C., at a speed of 10 to 16 seconds per millimeter thickness of the panel, and at a pressure range of about 5 kg per sq. cm. to about 45 kg per sq. cm. As shown in FIG. 3, optionally a continuous belt press system 14 with similar temperatures, pressures, and speeds can be used. The hydraulic systems and controls of standard industrial presses, which are typically used in the wood based composite panels industry, have to be modified to allow for the specific pressure modulations required during the press cycle of manufacturing the composite panels of the invention.

The composite panel of the invention may be used for interior floors and wall panels. The composite panels may be laminated or have other surface finishes. The composite panel of the current invention may be used for various interior or exterior applications. Exterior uses include signs, billboards, and other applications requiring a smooth surface, high moisture resistance and thermal stability.

The composite panels of the invention exhibit superior properties when tested with other panels currently used for flooring. One test involved a determination of linear thermal expansion. The composite panel of the invention with a laminate surface was compared to a laminated engineered wood (HDF) flooring sample and a hardwood flooring sample. The test determined the linear expansion of movement of the material when exposed to varying temperature conditions. The samples were acclimated for 48 hours to laboratory conditions of 70° F. and 50% Relative Humidity ("RH"). The samples were gauged for size and then exposed to cold acclimation of 0° F. for 48 hours. The samples were measured again and subjected to 140° F. for 48 hours. The samples were re-gauged and acclimated again to laboratory conditions and measured for the final time. The results show all measurements, two in each direction on each sample, from the stages as described and calculations were made to show changes to the samples in inches.

TABLE I

Composite panel of invention with laminate surface

| Composite panel of invention with laminate (in inches) | Width 1 | Width 2 | Length 1 | Length 2 |
| --- | --- | --- | --- | --- |
| Conditioned 70° F. 50% RH | 12.012 | 12.016 | 12.020 | 12.005 |
| Cold acclimation 0° F. | 12.008 | 12.013 | 12.017 | 12.003 |
| Hot acclimation 140° F. | 12.007 | 12.011 | 12.007 | 11.993 |
| Conditioned 70° F. 50% RH | 12.007 | 12.011 | 12.007 | 11.993 |
| Max change during test | −0.005 | −0.005 | −0.013 | −0.012 |
| Change after completion of test | −0.005 | −0.005 | −0.013 | −0.012 |
| Change from 0° F. to 140° F. | −0.001 | −0.002 | −0.010 | −0.010 |

TABLE II

Hardwood flooring sample

| Hardwood flooring (in inches) | Width 1 | Width 2 | Length 1 | Length 2 |
| --- | --- | --- | --- | --- |
| Conditioned 70° F. 50% RH | 3.135 | 3.138 | 12.637 | 12.344 |
| Cold acclimation 0° F. | 3.135 | 3.138 | 12.369 | 12.347 |
| Hot acclimation 140° F. | 3.130 | 3.133 | 12.350 | 12.326 |
| Conditioned 70° F. 50% RH | 3.135 | 3.138 | 12.360 | 12.337 |

TABLE II-continued

Hardwood flooring sample

| Hardwood flooring (in inches) | Width 1 | Width 2 | Length 1 | Length 2 |
| --- | --- | --- | --- | --- |
| Max change during test | −0.005 | −0.005 | −0.032 | −0.018 |
| Change after completion of test | 0.000 | 0.000 | −0.023 | −0.007 |
| Change from 0° F. to 140° F. | −0.005 | −0.005 | −0.019 | −0.021 |

TABLE III

Engineered Wood (HDF) Laminate flooring

| Engineered wood (in inches) | Width 1 | Width 2 | Length 1 | Length 2 |
| --- | --- | --- | --- | --- |
| Conditioned 70° F. 50% RH | 11.615 | 11.615 | 11.740 | 11.741 |
| Cold acclimation 0° F. | 11.613 | 11.613 | 11.737 | 11.739 |
| Hot acclimation 140° F. | 11.597 | 11.596 | 11.717 | 11.718 |
| Conditioned 70° F. 50% RH | 11.597 | 11.596 | 11.720 | 11.720 |
| Max change during test | −0.018 | −0.019 | −0.023 | −0.023 |
| Change after completion of test | −0.018 | −0.019 | −0.020 | −0.021 |
| Change from 0° F. to 140° F. | −0.016 | −0.017 | −0.020 | −0.021 |

As shown above, the composite panel of the invention withstood the changes in temperature with the least amount of change in size. This is particularly important in flooring materials. Any change is size of a floorboard will cause the laminate surface to be destroyed by bubbling, warping or peeling or may cause the actual floorboard to warp causing an uneven surface and delamination.

Other testing of the composite panel of the invention showed superior properties according to standards set forth by the North American Laminated Flooring Association (NALFA). The NALFA 3.6 Small Ball (Dart) Impact resistance test measures the ability of laminate flooring to resist fracture due to impact by a small diameter ball/dart (25 grams) falling onto the surface of the unrestricted laminate floor sample. Drops are conducted in incremental heights until the surface of the material is fractured. The panel was tested using proper underlayment. The composite panel of, the invention met the NALFA specified requirement for light commercial use.

Also performed was the NALFA 3.5 Large Ball Impact Resistance Test. This test measures the ability of laminate flooring to resist fracture due to impact by a large diameter ball/dart (25 grams) falling onto the surface of the unrestricted laminate floor sample. Drops are conducted in incremental heights until the surface of the material is fractured. The composite panel of the invention was tested using the proper underlay material. The composite panel of the invention met the NALFA specified requirement for heavy commercial use.

The NALFA 3.2 Thickness Swell test was performed on the composite panel of the invention. The test measures the ability of laminate flooring to resist edge thickness increases after being exposed to distilled water. Two 6 inch by 6 inch specimens of the composite panel of the invention were cut and the thickness calculated using a compressometer. The two samples were submerged one inch below the water line in 70° F. distilled water for 24 hours and then removed and re-measured. The thickness swell is calculated as a percentage of the original thickness. When submitted to these test conditions, the composite panels of the invention had a 0.004 inch thickness swell.

The composite panel of the invention was also submitted to the NALFA 3.1 static load test. The test determines the recovery properties of laminate floor covering after long term indentation (24 hours) under a specified load. The test sample is conditioned to equilibrium at 73° F. and 50% relative humidity. The initial thickness of the sample is determined using a dial micrometer with a flat presser foot 0.250 inches in diameter. A specified load is applied to the sample for 24 hours. After removal of the load, the sample is allowed to recover for 24 hours. The sample is re-gauged using the 0.250 inch diameter presser foot. The difference between the two measurements is reported as the residual compression. Different loads are used in 250 pound increments starting at 1,400 pounds and working backwards until the residual compression is 0.001 inches or less. The composite panel of the invention withstood 1,160 pounds with a residual compression of 0.001 inch loss (0.4%). The NALFA requires flooring to withstand 1,160 pounds per square inch for heavy commercial use.

Through testing, it was also concluded that the composite panel of the present invention has low total Volatile Organic Compounds ("VOC") emissions, formaldehyde emissions, and total aldehyde emissions. The composite panel made with recycled materials will likely meet the allowable Greenguard certification criteria for all pollutants. The results were obtained through an environmental chamber test following ASTMD 5116. Analysis was based on EPA Method IP-B for VOC's by thermal desorption followed by gas chromatography/mass spectrometry and EPA IP-6A for selected aldehydes by high performance liquid chromatography. Predicted concentrations were based on a standard floor usage of 13.1 $m^2$ in a room with ASHRAE ventilation conditions (32 $m^3$ in volume and 0.8 ACH) and assumed decay parameters. The results were as follows:

TABLE IV

Environmental testing of composite panel 24 hour Results:

| TVOC ($\mu g/m^2$ hr) | HCHO ($\mu g/m^2$ hr) | Total Aldehydes ($\mu g/m^2$ hr) |
|---|---|---|
| 9.3 | 18.0 | 18.0 |

96 hour Predicted Concentration Results:

| TVOC ($\mu g/m^3$) | HCHO (ppm) | Total Aldehydes (ppm) |
|---|---|---|
| <1 | 0.005 | 0.005 |

Accordingly, it will be understood that the preferred embodiment of the present invention has been disclosed by way of example and that other modifications and alterations may occur to those skilled in the art.

What is claimed is:

1. A process of forming a composite panel from recycled polyurethanes along with other materials incidental to at least one recycled component comprising the steps of:
    a. forming a core layer comprising the steps of: cutting and milling said recycled polyurethanes along with said other materials incidental to said at least one recycled component; passing the milled polyurethanes and said other materials incidental to said at least one recycled component through a screen to ensure all particles are not larger than about 3 millimeters in diameter; blending said recycled polyurethanes and said other materials incidental to said at least one recycled component with isocyanate and water, wherein a volume of said isocyanate is approximately 3% to 10% by weight and a volume of said water is approximately 1% to 9% by weight; cleaning said recycled polyurethanes and said other materials incidental to said at least one recycled component in a wind sifter;
    b. forming surface layers comprising the steps of: cutting and milling said recycled polyurethanes along with said other materials incidental to said at least one recycled component; blending said recycled polyurethanes and said other materials incidental to said at least one recycled component with isocyanate and water; cleaning said recycled polyurethanes and said other materials incidental to said at least one recycled component in a wind sifter; passing said milled polyurethane and said other materials incidental to said at least one recycled component through a screen to ensure all particles are not larger than about 1.5 millimeters in diameter;
    c. forming a three layer mat with said blended core layer and said blended surface layers wherein said core layer is between said surface layers; and
    d. pressing said mat with a press system at temperatures from about 40° C. to about 185° C. at a speed of about 1 to about 16 seconds per millimeter of panel thickness with a pressure of about 5 kg/cm² to about 45 kg/cm².

2. The process of claim 1, wherein said recycled polyurethanes are recycled polyisocyanurate foams.

3. The process of claim 1, wherein said recycled polyurethanes are recycled insulated foam panels.

4. The process of claim 1, wherein said recycled polyurethanes are recycled energy absorbent panels.

5. The process of claim 1, wherein said recycled polyurethanes and other materials incidental to said at least one recycled component are from a vehicle.

6. The process of claim 1, wherein said recycled polyurethanes and other materials incidental to said at least one recycled component are vehicle headliners.

7. The process of claim 1, wherein said recycled polyurethanes are selected from the group consisting of recycled polyisocyanurate foam, recycled insulated foam panels, recycled energy absorbent panels, recycled vehicle headliners, and mixtures thereof.

8. The process of claim 1, wherein said materials incidental to said at least one recycled component are selected from the group consisting of composite resins, cloth, adhesives, fiberglass, plastics, and mixtures thereof.

9. The process of claim 1, wherein said mat is pressed at temperatures from about 40° C. to about 185° C.

10. The process of claim 1, wherein said mat is pressed with a pressure of about 5 kg/cm² to about 45 kg/cm².

11. The process of claim 1, wherein said surface layers are composed of particles about 1.5 millimeters or less in diameter.

12. The process of claim 1, wherein said core is composed of particles about 3 millimeters or less in diameter.

13. The process of claim 1, wherein said isocyanate is diphenylmethane diisocyanate.

* * * * *